United States Patent [19]

Yamakita

[11] Patent Number: 5,755,120
[45] Date of Patent: May 26, 1998

[54] DYEING APPARATUS

[75] Inventor: Yoshimichi Yamakita, Uozu, Japan

[73] Assignee: YKK Corporation, Tokyo, Japan

[21] Appl. No.: 745,156

[22] Filed: Nov. 7, 1996

[30] Foreign Application Priority Data

Nov. 10, 1995 [JP] Japan ................... 7-326150

[51] Int. Cl.$^6$ ................................... D06B 5/18
[52] U.S. Cl. ................. 68/189; 68/148; 68/150
[58] Field of Search .................. 68/148, 189, 150, 68/157, 27, 149, 160, 188, 184

[56] References Cited

U.S. PATENT DOCUMENTS

| | | | |
|---|---|---|---|
| 653,580 | 7/1900 | Mather | 68/148 |
| 1,327,662 | 1/1920 | Dudley | 68/189 |
| 1,334,526 | 3/1920 | Dudley | 68/189 |
| 1,397,860 | 11/1921 | Dudley | 68/188 |
| 3,685,324 | 8/1972 | Vorderbruegge et al. | 68/150 |
| 4,173,132 | 11/1979 | Sugimoto | 68/189 |
| 4,452,055 | 6/1984 | Lejeune et al. | 68/189 |
| 4,854,137 | 8/1989 | Sugimoto et al. | 68/189 |

FOREIGN PATENT DOCUMENTS

| | | | |
|---|---|---|---|
| 2416798 | 10/1975 | Germany | 68/189 |
| 56-112555 | 9/1981 | Japan . | |
| 6-63170 | 8/1994 | Japan . | |

*Primary Examiner*—Amy B. Vanatta
*Attorney, Agent, or Firm*—Hill, Steadman & Simpson

[57] ABSTRACT

A dyeing apparatus comprises a dyeing vessel adapted to contain a dyeing liquid therein, a rotary shaft rotatably disposed as laterally suspended in the dyeing vessel, an impeller adapted to flow the dyeing liquid in a direction parallel to the rotary shaft, and a reel for permitting an article for dyeing to be rolled up thereon, the impeller and the reel being attached to the rotary shaft. The dyeing of the article rolled up on the reel is effected by causing the dyeing liquid to pass by permeation through the article from the lateral terminal part thereof by the rotation of the impeller. The rotary shaft may be rotated reversibly during the course of the dyeing.

20 Claims, 5 Drawing Sheets

DYEING APPARATUS

BACKGROUND OF THE INVENTION

1. Field of the Invention

This invention relates to a dyeing apparatus for dyeing a narrow cloth such as a fastener tape for a slide fastener, a hook-and-loop separable fastener, etc. at a low bath ratio or liquor ratio.

2. Description of the Prior Art

The dyeing machine for a narrow tape which, as disclosed in Japanese Patent Publication No. 6-63,170, for example, implements the dyeing by laterally suspending a rotary shaft in a dye bath inside a pressure vessel, winding the narrow tape transversely on the rotary shaft, and rotating the wound narrow tape in a dyeing liquid and the dyeing machine of a low bath ratio which, as disclosed in published Japanese Patent Application, KOKAI (Early Publication) No. 56-112,555, for example, effects the dyeing of a given article by laterally suspending a perforated tube in a dyeing pot, winding the article on the perforated tube, disposing waterwheel vanes one each at the opposite terminal parts of the perforated tube, enabling the dyeing pot in rotation to scoop the dyeing liquid from the bottom part of the dyeing pot and transfer it into the perforated tube, and causing the dyeing liquid in the perforated tube to be discharged outwardly through the holes formed in the perforated tube by virtue of the centrifugal force generated by the rotation thereby dyeing the article wound on the perforated tube have been heretofore known.

The former dyeing machine is liable to dye the narrow tape only unevenly or induce the narrow tape to be entangled because it requires the narrow tape to be wound transversely on the rotary shaft in preparation for the dyeing. The latter dyeing machine, owing to its inability to vary the amount of the dyeing liquid proportionately to the amount of the article to be dyed, is liable to consume the dyeing liquid and the heating energy excessively and entail the problem of high cost of production.

SUMMARY OF THE INVENTION

An object of the present invention, therefore, is to provide a dyeing apparatus which smoothly dyes such an article as a narrow cloth at a low bath ratio without entailing such problems as uneven dyeing of cloth and entanglement of cloth while using the dyeing liquid in an amount proportionate to the amount of the cloth being dyed.

To accomplish this object, the present invention provides a dyeing apparatus which comprises a dyeing vessel adapted to contain a dyeing liquid therein, a rotary shaft rotatably disposed as laterally suspended in the dyeing vessel, an impeller adapted to flow the dyeing liquid in a direction parallel to the rotary shaft, and a reel for permitting an article for dyeing to be rolled up thereon, the impeller and the reel being attached to the rotary shaft. The dyeing of the article rolled up on the reel is effected by causing the dyeing liquid to pass by permeation through the article from the lateral terminal part thereof by the rotation of the impeller.

Owing to the construction described above, it is possible to dye the article at a low bath ratio by a simple structure using no such means as a circulation pump. Particularly in the dyeing of a narrow cloth whose rolled layer has a thickness larger than the width thereof, the dyeing apparatus of the present invention is at an advantage in effecting the dyeing uniformly and quickly because the dyeing liquid is passed by permeation through the rolled layer of the narrow cloth having a smaller thickness from the lateral terminal part thereof.

In one preferred embodiment of the present invention, the dyeing apparatus comprises at least one reel and at least two impellers. The impellers are disposed on both sides of the reel as attached to the rotary shaft and the rotary shaft is adapted to be rotated reversibly during the course of the dyeing.

By periodically reversing the rotation of the rotary shaft to which the reel having the article for dyeing rolled up thereon and the impellers are mounted while the dyeing is in process, the direction of the flow of the dyeing liquid can be changed and the dyeing liquid therefore can be passed by permeation through the article from the opposite lateral terminal parts thereof. Further, the periodic change of the direction of rotation of the rotary shaft enables the article to be dyed quickly and uniformly because it improves the permeation of the dyeing liquid into the article by causing the article wound on the reel to be tightened by the normal rotation and slacked by the reverse rotation.

In another preferred embodiment of the present invention, the impeller and the reel are severally provided with the inner cylindrical parts for attachment to the rotary shaft and the inner cylindrical parts are provided in the peripheral parts thereof with openings adapted to be interconnected for forming flow paths for circulation of the dyeing liquid. By providing the openings around the inner cylindrical parts of the impeller and the reel and thereby forming the return paths for the circulation of the dyeing liquid as described above, it is made possible to smooth the circulation of the dyeing liquid and effect necessary dyeing quickly and uniformly.

It is further allowable to have the impeller and the reel replaceably attached to the rotary shaft. This arrangement allows use of impellers and reels having the sizes of opening and the positions of winding varied proportionately to the amount of the article for dyeing and permits a reduction in the cost of production.

Appropriately, protective members which are pervious to the dyeing liquid and capable of preventing rolled narrow cloth from laterally collapsing may be disposed one each in the opposite terminal parts of the reel attached to the rotary shaft. They allow an addition to the force of the jet of the dyeing liquid caused by the impeller and to the intensity of the passage of the dyeing liquid into the article being dyed and, therefore, enable the dyeing to be effected uniformly and quickly.

BRIEF DESCRIPTION OF THE DRAWINGS

Other objects, features, and advantages of the invention will become apparent from the following description taken together with the drawings, in which.

DETAILED DESCRIPTION OF THE PREFERRED EMBODIMENTS

Figure 1:
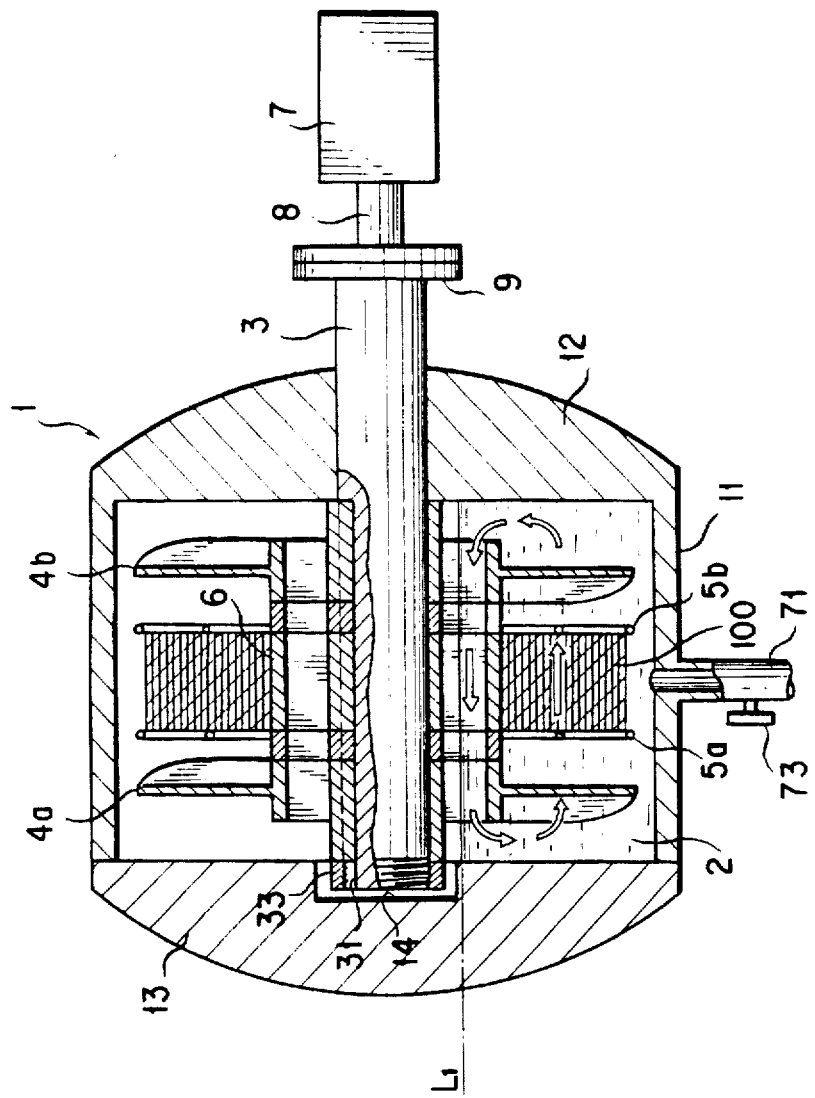
FIG. 1 is a longitudinal section of the essential part of a first embodiment of the dyeing apparatus of the present invention.

Now, the present invention will be described below with reference to embodiments thereof illustrated in the drawings.

Figure 2:
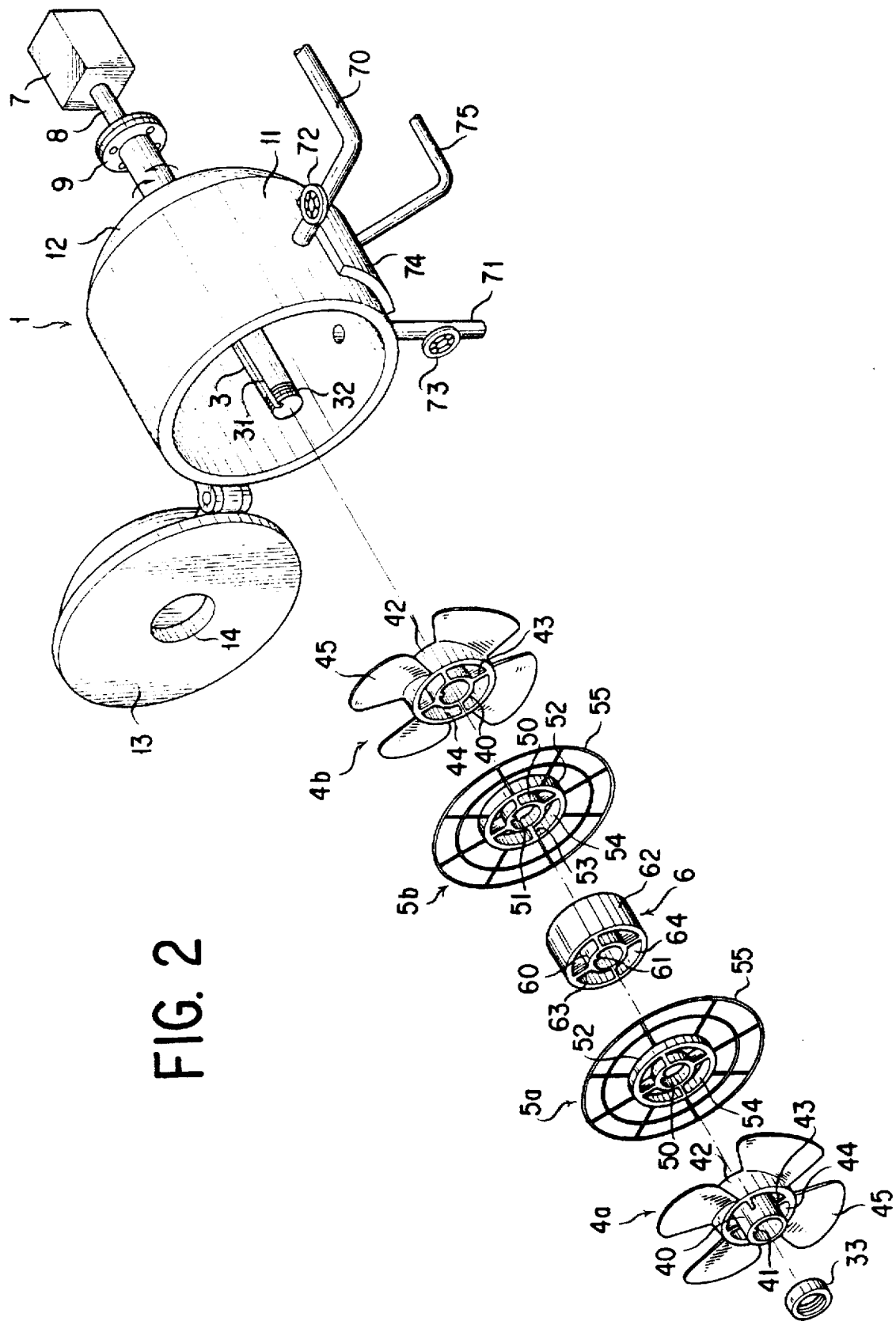
FIG. 2 is an exploded perspective view of the dyeing apparatus illustrated in FIG. 1.

Referring to FIG. 1 and FIG. 2 which illustrate the first embodiment of the present invention, the dyeing apparatus of this embodiment comprises a dyeing vessel 1, a rotary shaft 3 rotatably disposed in the vessel 1 so as to be laterally extended therein, a pair of impellers or screws 4a and 4b, a pair of protective members 5a and 5b, and a reel 6 severally attached to the rotary shaft 3, a feed pipe 70 and a discharge pipe 71 for a dyeing liquid and a heating part 74 severally attached to the dyeing vessel 1.

The dyeing vessel 1 assumes the shape of a hollow cylinder formed of a cylindrical wall 11 and a lateral wall 12 integrally formed at one end thereof. A closure or cap 13 is attached to the other end of the dyeing vessel 1 so as to be freely opened and closed. The impellers 4a and 4b, the protective members 5a and 5b, and the reel 6 to be attached to the rotary shaft 3 which is suspended laterally at the center of the interior of the vessel 1, therefore, are allowed to be inserted round and extracted from the rotary shaft 3 through this closure 13. The closure 13 has a depressed part 14 formed in the central part of the inner surface thereof so as to fit round and support in position the free terminal part of the rotary shaft 3 laterally suspended inside the vessel 1. The lower part of the vessel 1 forms a dyeing chamber 2 for reserving the dyeing liquid. Although the vessel 1 is provided with a sealing mechanism as usual, it is omitted from the illustration. To the cylindrical wall 11 of the vessel 1 that defines the dyeing chamber 2, the dyeing liquid feed pipe 70 and the dyeing liquid discharge pipe 71 are connected as shown in FIG. 2. By properly manipulating valves 72 and 73 provided in these pipes, the dyeing liquid is fed into the dyeing chamber 2 or discharged therefrom. The vessel 1 is provided beside the lower part of the cylindrical wall 11 thereof with the heating part 74 for heating the dyeing liquid. A heating medium feed pipe 75 serves the purpose of feeding a heating medium such as, for example, steam, to the heating part 74.

The rotary shaft 3 is rotatably attached to the lateral wall 12 so as to be positioned along the line of the central axis of the dyeing vessel 1. It forms at one terminal thereof a free end adapted to permit replacement of the impellers 4a and 4b, the protective members 5a and 5b and the reel 6. The leading terminal of this free end is fitted into and supported by the depressed part 14 of the closure 13. The other terminal of the rotary shaft 3 protrudes laterally from the dyeing vessel 1. A drive shaft 8 of a motor 7 is connected to the terminal part through the medium of a coupling 9 so as to impart a reversible rotation to the rotary shaft 3. On one side of the periphery of the rotary shaft 3, a groove 31 is formed parallelly to the axis. Ridges 41, 51, and 61 which, as will be described specifically hereinafter, are raised from the inner surfaces of inner cylindrical parts 40, 50, and 60 respectively of the impellers 4a and 4b, the protective members 5a and 5b, and the reel 6 are sequentially fitted into the groove 31. A threaded part 32 is formed in the leading terminal of the free end of the rotary shaft 3. A stop member or nut 33 is fastened to the threaded part 32 of the rotary shaft 3 to fix the impellers 4a and 4b, the protective members 5a and 5b, and the reel 6 which have been attached to the rotary shaft 3.

FIG. 2 is a perspective view showing the sequence of attachment of the impellers 4a and 4b, the protective members 5a and 5b, and the reel 6 to the rotary shaft 3. The pair of protective members 5a and 5b and the pair of impellers 4a and 4b are severally parted across the reel 6 as the center and disposed sequentially in the order mentioned on the opposite sides of the reel 6. The impellers 4a and 4b are provided in the central parts thereof with the inner cylindrical parts or fitting cylindrical parts 40. The cylindrical parts 40 are provided on the inner surfaces thereof with the ridges 41 adapted to fit into the groove 31 of the rotary shaft 3. Outside the fitting cylindrical parts 40, outer cylindrical parts or basal parts 42 respectively of the impellers 4a and 4b which have a plurality (four in the illustrated embodiment) of vanes 45 fixed thereto are disposed through the medium of connecting arms 43, so that the dyeing liquid in the dyeing chamber 2 will be spouted and circulated in one direction as indicated by the arrow mark in FIG. 1. The several connecting arms 43 which serve to link the fitting cylindrical parts 40 to the basal parts 42 of the impellers 4a and 4b are severally separated with openings 44. These openings 44 communicate with openings 54 and 64 which are formed in the protective members 5a and 5b and the reel 6 as will be specifically described herein below to form return paths for the dyeing liquid in circulation as shown in FIG. 1.

The protective members 5a and 5b are fixed as approximated closely to the opposite terminal parts of the reel 6 and are formed of the inner cylindrical parts or fitting cylindrical parts 50 and the outer cylindrical parts or basal parts 52 equal in diameter respectively to the fitting cylindrical parts 40 and the basal parts 42 of the impellers 4a and 4b and supporting shanks 55 projected radially from the peripheries of the basal parts 52 and adapted each to form a reticular empty space. The ridges 51 adapted to fit into the groove 31 of the rotary shaft 31 are formed inside the fitting cylindrical parts 50. The fitting cylindrical parts 50 and the basal parts 52 are interconnected with a plurality of connecting arms 53. The connecting arms 53 are mutually separated with intervening openings 54. These openings 54 communicate with the openings 44 and 64 in the impellers 4a and 4b and the reel 6 to form return paths for the dyeing liquid being circulated. The protective members 5a and 5b constructed as described above are seated in the opposite terminal parts of the reel 6 and disposed so as to prevent the roll of an article 100 to be dyed from being laterally collapsed by the collision of the jets of the dyeing liquid formed by the rotation of the impellers 4a and 4b. The protective members 5a and 5b may be formed as two separate pieces as illustrated in FIG. 2. Otherwise, they may be formed in the opposite lateral terminal parts of the reel 6 integrally therewith in the shape of flanges provided with supporting shanks forming a reticular empty space. In this case, the vanes 45 of the impellers 4a and 4b and the flanges must be disposed as separated by a prescribed distance capable of protecting the jets of the dyeing liquid against turbulence.

The reel 6 is intended to permit the article 100 for dyeing such as a fastener tape for a slide fastener or a hook-and-loop fastener which is made of narrow cloth to be rolled up thereon. It is provided in the central part thereof with the inner cylindrical part or fitting cylindrical part 60 adapted to fit round the rotary shaft 3. On the inner surface of the cylindrical part 60, the ridge 61 is formed in the same manner as in the impellers 4a and 4b and the protective members 5a and 5b and is fitted into the groove 31 of the rotary shaft 3. Several connecting arms 63 are projected from the periphery of the fitting cylindrical part 60 and connected to an outer cylindrical part or basal part 62 on which the article 100 for dyeing is to be rolled up. The connecting arms 63 are mutually separated with openings 64. These openings 64 communicate with the openings 44 and 54 in the impellers 4a and 4b and the protective members 5a and 5b to form return paths for the dyeing liquid being circulated.

Figure 3:
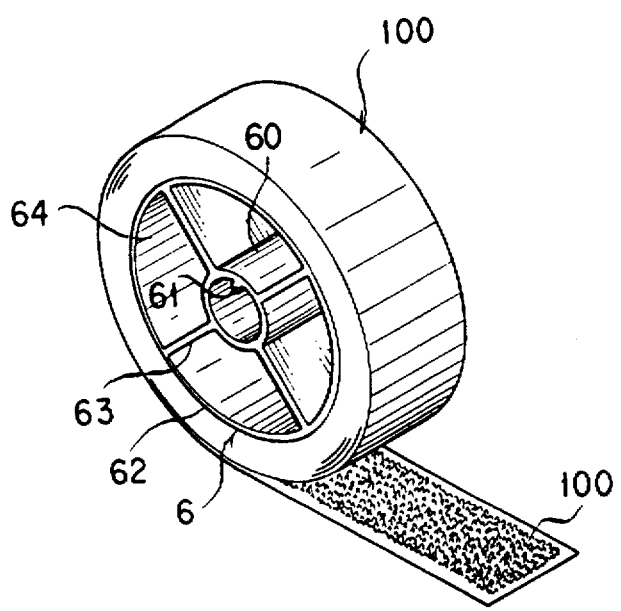
FIG. 3 is a perspective view illustrating a hook-and-loop fastener rolled up on a reel.

FIG. 3 illustrates the reel 6 posed in a state having rolled up thereon a hook-and-loop fastener as a concrete example of the narrow cloth of the article 100 for dyeing. Since the hook-and-loop fastener has hooks and/or loops raised as engaging elements from the surface of the basal fabric thereof, these engaging elements are particularly liable to be deformed during the course of dyeing. In the dyeing apparatus of the present invention, since the roll of the hook-and-loop fastener is dyed by causing the jet of the dyeing liquid to permeate the rolled fastener from the lateral side thereof, the dyeing is attained without collapsing the hooks and/or loops. Thus, this dyeing apparatus can provide the optimum method of dyeing for the hook-and-loop fastener.

Figure 4:
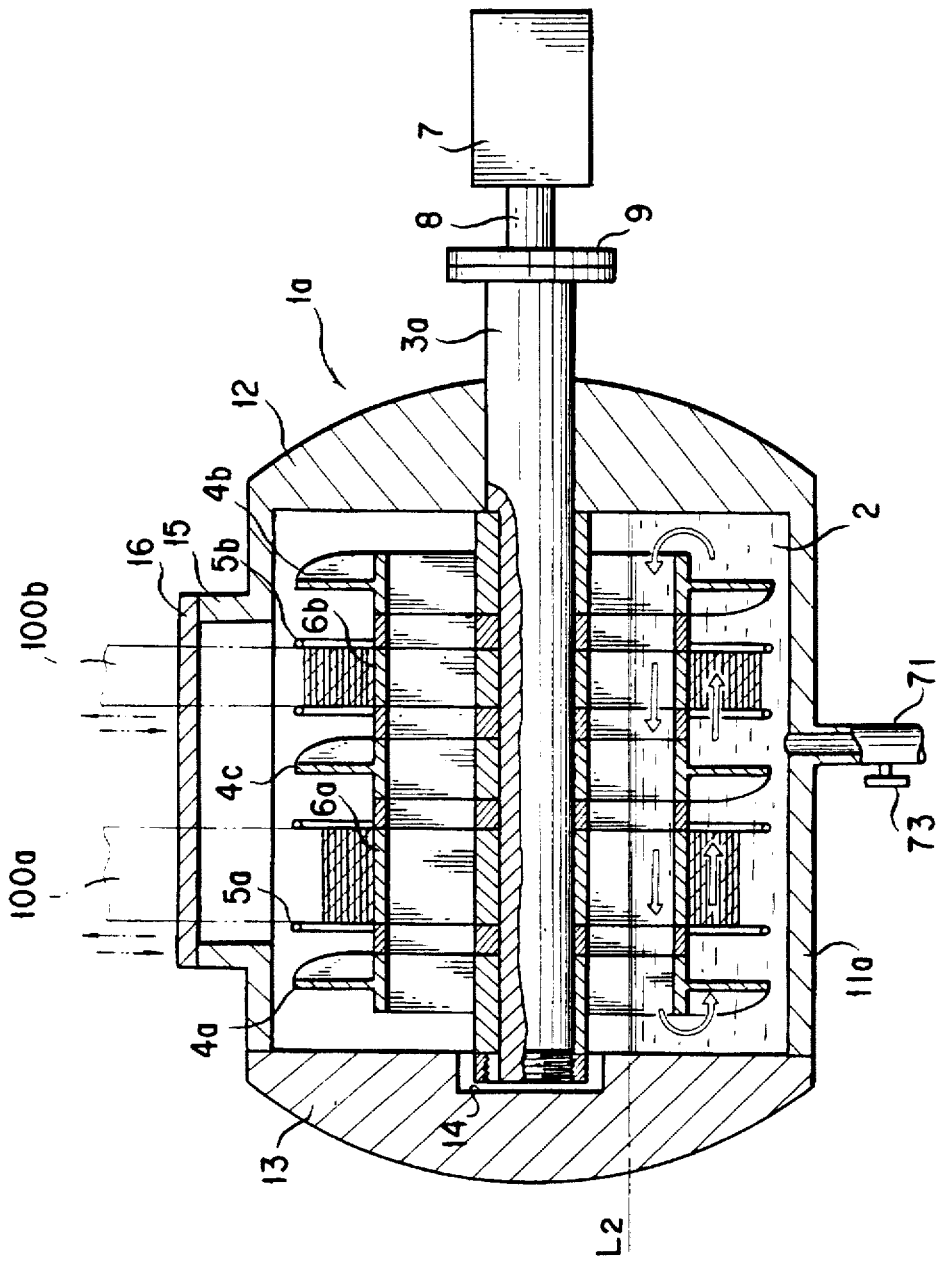
FIG. 4 is a longitudinal section of the essential part of the second embodiment of the dyeing apparatus of the present invention.

The impellers 4a and 4b, the protective members 5a and 5b, and the reel 6 are replaceable so that those having openings just fit for the particular amount of the article 100 for dyeing to be rolled up on the reel 6 may be selected for service. When the article 100 for dyeing is in a small amount, for example, the reel 6 which is so constructed as to give large volumes to the opening 64, namely to insert large intervals between the fitting cylindrical part 60 and the basal part 62, and the impellers 4a and 4b and the protective members 5a and 5b which are so constructed as to have their respective openings 44 and 54 enlarged to conform with the opening 64 of the reel 6 are used so that the article 100 for dyeing may be rolled up closely to the outer periphery of the reel 6 and may be consequently dyed with a small amount of the dyeing liquid near the bottom part of the dyeing chamber 2 as illustrated in FIG. 4. By preparing several sets of impellers 4a and 4b, protective members 5a and 5b, and reels 6 which have openings thereof varied proportionately to the prospective varying amounts of the article for dyeing and using them as suitably replaced, therefore, the dyeing apparatus of the present invention can dye a given article with the dyeing liquid of an amount just fit for the amount of the article and consequently can decrease the cost of production.

The first embodiment described above represents a case of having one reel 6 fixed on the rotary shaft 3. By disposing two reels 6a and 6b attached to one rotary shaft 3a inside a dyeing vessel 1a as illustrated in FIG. 4, cloths of different widths can be dyed simultaneously. It is also allowable to divide the interior of a dyeing vessel 1b with partitions 20a and 20b into a plurality of dyeing chambers 2a, 2b, and 2c, dispose one rotary shaft 3b therethrough, and attach impellers 4a and 4b, protective members 5a and 5b, and a reel 6 to the common rotary shaft 3b severally inside the dyeing chambers as illustrated in FIG. 5 and dye articles with dyeing liquids of varying colors in the plurality of dyeing chambers.

Figure 5:
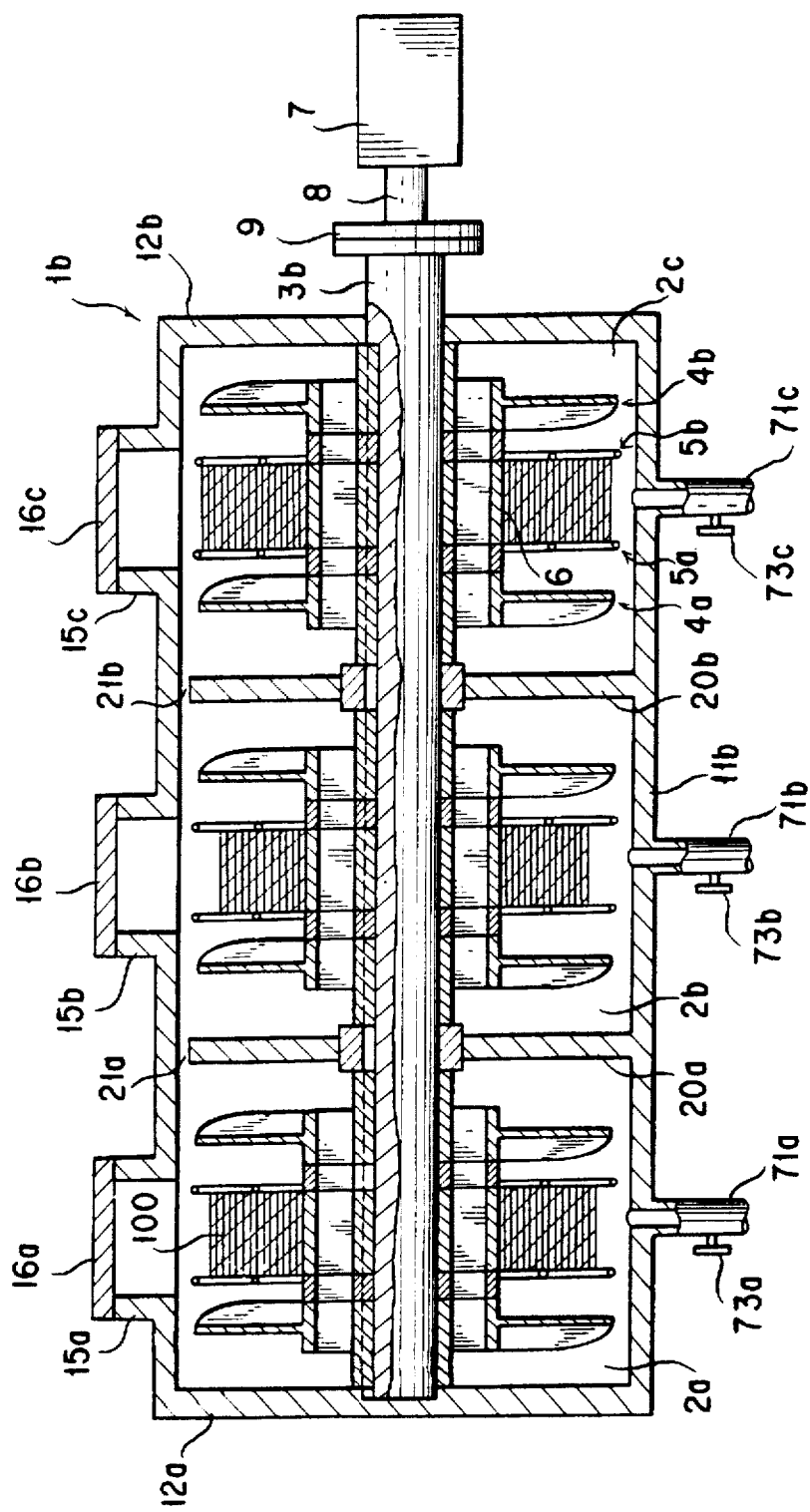
FIG. 5 is a longitudinal section of the essential part of the third embodiment of the dyeing apparatus of the present invention.

FIG. 4 and FIG. 5 respectively represent the second and the third embodiment of the dyeing apparatus of the present invention.

The dyeing apparatus illustrated in FIG. 4 differs from the first embodiment described above in respect that two reels 6a and 6b, two pairs of (a total of four) protective members 5a and 5b severally disposed on the opposite sides of the reels, and three impellers 4a, 4b, and 4c disposed two outside and one between the reels 6a and 6b are attached to the common rotary shaft 3a and further that a lid 16 is attached as freely opened and closed to an opening part 15 formed as extended across the gap between the reels 6a and 6b above a cylindrical wall 11a of the dyeing vessel 1a. The component members of the dyeing apparatus, however, are identical in basic structure to those of the first embodiment. In the case of the dyeing apparatus of the present embodiment, since the reels different in length from each other as illustrated in FIG. 4 are used, two articles 100a and 100b differing in width can be dyed at the same time. When this dyeing apparatus is constructed to use a plurality of reels equalling in length, it can dye a plurality of articles equalling in width at the same time. The operation of winding the articles 100a and 100b on the reels 6a and 6b and that of unwinding them from the reels 6a and 6b may be directly performed through the opening part 15 as indicated by an alternate one dash two dot line in FIG. 4 after the lid 16 has been opened. Otherwise, in the same manner as in the first embodiment, these operations can be performed after the closure 13 has been opened and the reels 6a and 6b have been removed from the rotary shaft 3a.

In the dyeing apparatus illustrated in FIG. 5, a dyeing vessel 1b is formed of a closed cylinder comprising a cylindrical wall 11b and lateral walls 12a and 12b fixed one each in the opposite terminal parts of the cylindrical wall 11b. The dyeing vessel 1b has the interior thereof divided with two partitions 20a and 20b into three dyeing chambers 2a, 2b, and 2c. In each part of the common rotary shaft 3b positioned inside each of the dyeing chambers, one reel 6 and two protective members 5a and 5b and two impellers 4a and 4b severally disposed on the opposite sides of the reel 6 are fixed in the same manner as in the first embodiment. Then, opening parts 15a, 15b, and 15c are formed in the cylindrical wall 11b respectively above the dyeing chambers 2a, 2b, and 2c and lids 16a, 16b, and 16c are so fixed to the respective opening parts mentioned above as to be freely opened and closed. In this case, since the dyeing vessel 1b is kept in a closed state without being provided with such a closure as is shown in FIG. 1, communicating openings 21a and 21b are formed respectively in the upper parts of the partitions 20a and 20b so that the uniform pressure is retained inside the dyeing chambers while the dyeing is in process therein. In the dyeing apparatus constructed as described above, the operation of winding the articles 100 on the reels 6 and that of unwinding them from the reels 6 are attained after the lids 16a, 16b, and 16c disposed respectively above the dyeing chambers 2a, 2b, and 2c have been opened in the same manner as in the embodiment of FIG. 4. To the dyeing chambers 2a, 2b, and 2c, dyeing liquid discharge pipes 71a, 71b, and 71c provided respectively with valves 73a, 73b, and 73c and dyeing liquid supply pipes (not shown) are connected.

Now, the dyeing by the use of the dyeing apparatus of the present invention will be described below with reference to FIG. 1. First, the article 100 for dyeing is rolled up on the reel 6 which fits the amount of the article 100. Then, the impellers 4a and 4b and the protective members 5a and 5b which have openings 44 and 54 conforming to the opening 64 of the reel 6 are attached in the sequence illustrated in FIG. 2 to the rotary shaft 3 in the dyeing vessel 1. After the leading end of the rotary shaft 3 has been closed by screwing the stop member 33 thereon, the closure 13 of the dyeing vessel 1 is closed and the valve 72 in the dyeing liquid feed pipe 70 is opened to supply the dyeing liquid until it reaches the level indicated in $L_1$ shown in FIG. 1. Then, a heating medium such as steam is supplied via the heating medium feed pipe 75 to the heating part 74 to elevate the temperature of the dyeing liquid and the rotary shaft 3 is set rotating with the motor 7. As a result, the dyeing liquid in the dyeing chamber 2 of the dyeing vessel 1 is propelled by the front impeller 4a in the direction of the arrow mark shown in FIG. 1, passed through the protective member 5a, caused to collide into the lateral terminal part of the article 100 for dyeing rolled up on the reel 6, passed into the article, discharged from the opposite side thereof, propelled backward by the rear impeller 4b, and returned to the front through the flow paths formed by the openings 44, 54, and 64 of the impellers 4a and 4b, the protective members 5a and 5b and the reel 6 attached to the rotary shaft 3, thereby forming a circulating stream of the dyeing liquid for dyeing. After the article has been dyed at a stated temperature for a stated duration by the circulating stream of the dyeing liquid described above, the valve 73 in the dyeing liquid discharge pipe 71 connected to the bottom of the dyeing vessel 1 is opened to discharge the dyeing liquid and the closure 13 is opened to permit extraction of the reel 6 together with the impellers 4a and 4b and the protective members 5a and 5b from the rotary shaft 3. The dyed article as a final product is unwound from the reel 6 to complete the dyeing. During the dyeing operation, the rotation of the rotary shaft 3 may be periodically reversed to change the flow of the dyeing liquid to the direction opposite the direction indicated by the arrow mark in FIG. 1 and cause the dyeing liquid to permeate the article 100 for dyeing rolled up on the reel 6 from the lateral terminal part on the opposite side. Since the periodic change of the direction of rotation of the rotary shaft 3 causes the article wound on the reel to be tightened by the normal rotation and slacked by the reverse rotation, the permeation of the dyeing liquid into the article will be exalted and the article will be dyed quickly and uniformly.

Thus, the dyeing apparatus of the present invention can dye a given article at a low bath ratio or liquor ratio because the operating mechanism thereof resides in using the impellers 4a and 4b for forcing the dyeing liquid to circulate, collide against the article in the lateral direction, and pass by permeation therethrough. Further, since the dyeing is implemented by the collision of the dyeing liquid against the lateral terminal part of the roll of the article for dyeing, and particularly since the dyeing liquid is passed by permeation through the rolled layer of the narrow cloth having a smaller thickness from the lateral terminal part, the dyeing aimed at can be effected more quickly and uniformly than when the dyeing liquid is caused to permeate the rolled layer from the peripheral surface side having a larger layer thickness.

In the case of the dyeing apparatus shown in FIG. 4, even when the article for dyeing is in a small amount, since the rolled part of the article is approximated closely to the periphery of the reel 6 as shown in FIG. 4, the dyeing liquid of such a small amount as has the level thereof indicated by the mark $L_2$ suffices for attaining the dyeing aimed at. Further, since the openings 44, 54, and 64 of the impellers 4a, 4b, and 4c, the protective members 5a and 5b, and the reels 6a and 6b are formed in large sizes, they form ample flow paths for the circulation of the dyeing liquid and pose no hindrance to the flow of the dyeing liquid. Two reels 6a and 6b different in width for permitting articles for dyeing to be rolled up thereon may be attached as parallelly arranged to the rotary shaft 3a as illustrated in FIG. 4. Alternatively, the reels of the same size used for rolling up articles may be attached as parallelly arranged to the rotary shaft. It is also permissible to divide the interior of the dyeing vessel into several dyeing chambers 2a, 2b, and 2c and allow a plurality of reels 6 disposed severally in the different dyeing chambers to be fixed to the common rotary shaft 3b as illustrated in FIG. 5 so as to dye articles in different colors in the different dyeing chambers. The lids 16, 16a, 16b, and 16c may be attached as freely opened and closed to the upper parts of the dyeing vessels as illustrated in FIG. 4 and FIG. 5 so that the articles for dyeing may be wound on and unwound from the reels 6, 6a and 6b which are kept attached meanwhile to the rotary shafts 3a and 3b.

While there have been shown and described several preferred embodiments of the invention, it is to be clearly understood that the invention is not limited thereto but may be variously embodied and practiced otherwise. While the first embodiment illustrated in FIG. 1 represents a case of having impellers disposed one each on the opposite sides of the reel, one impeller may be disposed on one side of the reel. By the same token, the numbers of reels and impellers to be mounted on the rotary shaft may be arbitrarily selected. The described embodiments are therefore to be considered in all respects as illustrative and not restrictive, the scope of the invention being indicated by the appended claims rather than by the foregoing description and all changes which come within the meaning and range of equivalency of the claims are, therefore, intended to be embraced therein.

What is claimed is:

1. A dyeing apparatus comprising a dyeing vessel adapted to contain a dyeing liquid therein, a rotary shaft rotatably disposed as laterally suspended in said dyeing vessel, an impeller adapted to flow said dyeing liquid in a direction parallel to said rotary shaft, and a reel for permitting an article for dyeing to be rolled up thereon, said impeller and said reel being attached to said rotary shaft, whereby the dyeing of said article is effected by causing said dyeing liquid to pass by permeation through said article from the lateral terminal part thereof by the rotation of said impeller.

2. The apparatus according to claim 1, which comprises at least one reel and at least two impellers, said impellers being disposed on both sides of said reel as attached to said rotary shaft and said rotary shaft being adapted to be rotated reversibly during the course of the dyeing.

3. The apparatus according to claim 1, wherein said impeller and said reel are severally provided with inner cylindrical parts for attachment to said rotary shaft and said inner cylindrical parts are provided in the peripheral parts thereof with openings adapted to be interconnected for forming flow paths for circulation of said dyeing liquid.

4. The apparatus according to claim 1, wherein said impeller and said reel are attached replaceably to said rotary shaft.

5. The apparatus according to claim 1, which further comprises protective members disposed in the opposite lateral terminal parts of said reel attached to said rotary shaft, said protective members being capable of preventing a rolled layer of said article from laterally collapsing and pervious to the flow of said dyeing liquid.

6. The apparatus according to claim 5, wherein said protective members each comprise an inner cylindrical part to be attached to said rotary shaft, an outer cylindrical part connected through the medium of a plurality of arms to said inner cylindrical part, and a reticular backbone member raised from said outer cylindrical part, said inner cylindrical part, said outer cylindrical part encircling said inner cylindrical part, and said arms jointly defining openings.

7. The apparatus according to claim 5, wherein said protective members are integrally formed in the opposite lateral terminal parts of said reel.

8. The apparatus according to claim 1, wherein said reel comprises an inner cylindrical part to be attached to said rotary shaft and an outer cylindrical part connected through the medium of a plurality of arms to said inner cylindrical part, said inner cylindrical part, said outer cylindrical part encircling said inner cylindrical part, and said arms jointly defining openings.

9. The apparatus according to claim 1, wherein said impeller comprises an inner cylindrical part to be attached to said rotary shaft, an outer cylindrical part connected through the medium of a plurality of arms to said inner cylindrical part, and a plurality of vanes raised from said outer cylindrical part, said inner cylindrical part, said outer cylindrical part encircling said inner cylindrical part, and said arms jointly defining openings.

10. The apparatus according to claim 1, wherein said dyeing vessel comprises a hollow cylindrical body closed on one lateral part thereof and provided on the other lateral part thereof with a closure attached to said hollow cylindrical body in a state to be freely opened and closed.

11. The apparatus according to claim 10, wherein said dyeing vessel is provided in the upper part of a cylindrical wall of said hollow cylindrical body with an opening part and a lid attached to said opening part in a state to be freely opened and closed.

12. The apparatus according to claim 1, wherein said dyeing vessel comprises a hollow cylindrical body, the empty space in said cylindrical body being divided with at least one partition into a plurality of dyeing chambers, said dyeing vessel being provided with one common rotary shaft laid through said dyeing chambers, and said reel and said impeller disposed on the lateral part of said reel being attached to each of the portions of said rotary shaft positioned inside said dyeing chambers.

13. The apparatus according to claim 12, wherein said partition is provided in the upper part thereof with an opening allowing communication between the empty spaces of the adjacent dyeing chambers.

14. The apparatus according to claim 12, wherein said cylindrical body is closed on the opposite lateral parts thereof.

15. A dyeing apparatus comprising:

a dyeing vessel adapted to contain a dyeing liquid therein;

a rotary shaft rotatably disposed as laterally suspended in said dyeing vessel;

at least one reel comprising an inner cylindrical part to be attached to said rotary shaft and an outer cylindrical part connected through the medium of a plurality of arms to said inner cylindrical part, said inner cylindrical part, said outer cylindrical part encircling said inner cylindrical part, and said arms jointly defining openings;

protective members each comprising an inner cylindrical part to be attached to said rotary shaft, an outer cylindrical part connected through the medium of a plurality of arms to said inner cylindrical part, and a reticular backbone member raised from said outer cylindrical part, said inner cylindrical part, said outer cylindrical part encircling said inner cylindrical part, and said arms jointly defining openings, and said protective members being disposed one each on both sides of said reel attached to said rotary shaft; and impellers each comprising an inner cylindrical part to be attached to said rotary shaft, an outer cylindrical part connected through the medium of a plurality of arms to said inner cylindrical part, and a plurality of vanes raised from said outer cylindrical part, said inner cylindrical part, said outer cylindrical part encircling said inner cylindrical part, and said arms jointly defining openings, and said impellers being disposed one each on the opposite lateral terminal sides of said protective members.

16. The apparatus according to claim 15, wherein said rotary shaft is adapted to be rotated reversibly during the course of the dyeing.

17. The apparatus according to claim 15, wherein said dyeing vessel comprises a hollow cylindrical body closed on one lateral part thereof and provided on the other lateral part thereof with a closure attached to said hollow cylindrical body in a state to be freely opened and closed.

18. The apparatus according to claim 17, wherein said dyeing vessel is provided in the upper part of a cylindrical wall of said hollow cylindrical body with an opening part and a lid attached to said opening part in a state to be freely opened and closed.

19. The apparatus according to claim 15, wherein said dyeing vessel comprises a hollow cylindrical body, the empty space in said cylindrical body being divided with at least one partition into a plurality of dyeing chambers, said dyeing vessel being provided with one common rotary shaft laid through said dyeing chambers, and said reel, said protective members, and said impellers being attached to each of the portions of said rotary shaft positioned inside said dyeing chambers.

20. The apparatus according to claim 19, wherein said partition is provided in the upper part thereof with an opening allowing communication between the empty spaces of the adjacent dyeing chambers.

* * * * *